United States Patent

[11] 3,582,608

| [72] | Inventors | Teiji Ito;<br>Takeshi Nishi; Tetsuya Hidaka; Tsurugi Kimura, all of Kitakyushu, Japan |
|---|---|---|
| [21] | Appl. No. | 878,387 |
| [22] | Filed | Nov. 20, 1969 |
| [45] | Patented | June 1, 1971 |
| [73] | Assignee | Nippon Steel Corporation<br>Tokyo, Japan |
| [32] | Priority | Feb. 26, 1966 |
| [33] | | Japan |
| [31] | | 41/11468 |
| | | Continuation-in-part of application Ser. No. 618,215, Feb. 23, 1967. |

[54] METHOD OF ARC WELDING THICK MEMBERS BY RECIPROCATION OF A WELDING WIRE ELECTRODE
5 Claims, 12 Drawing Figs.

[52] U.S. Cl. .................................................. 219/137, 219/126

[51] Int. Cl. ...................................................... B23k 9/00
[50] Field of Search ............................................ 219/126, 137

[56] References Cited
UNITED STATES PATENTS

| 2,866,078 | 12/1958 | Ballentine, Jr. ............. | 219/126 |
| 2,871,339 | 1/1959 | Jackson et al. ............. | 219/137 |

*Primary Examiner*—J. V. Truhe
*Assistant Examiner*—C. L. Albritton
*Attorney*—Wenderoth, Lind & Ponack ABSTRACT: A method of welding thick members such as plates in the vertical direction. The gap between the plates is made small, and only the welding wire serving as the electrode is inserted in a generally horizontal direction into the gap. By appropriately controlling the speed of the wire feed means, the tip of the wire is made to transverse the gap as it is moved upwardly along the gap to deposit weld metal in the gap.

PATENTED JUN 1 1971

INVENTORS
TEIJI ITO
TAKESHI NISHI
TETSUYA HIDAKA
TSURUGI KIMURA

BY *Wenderoth, Lind & Ponack*
ATTORNEYS

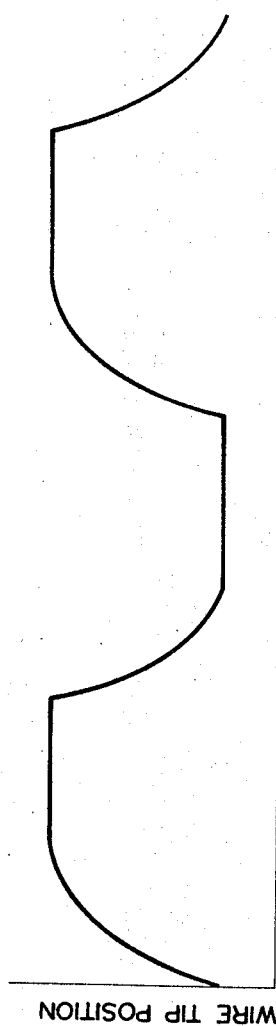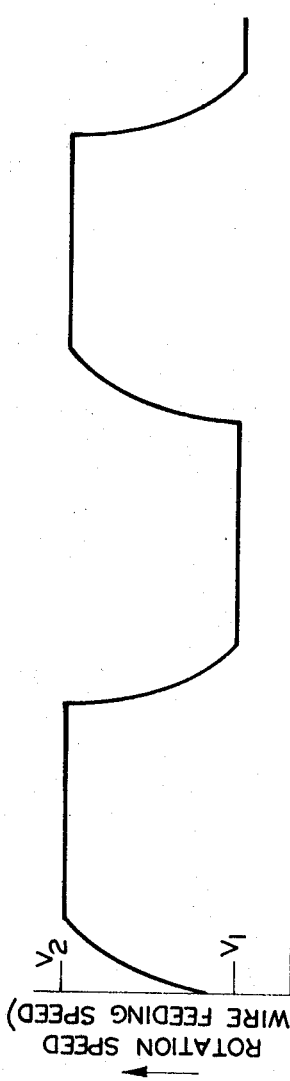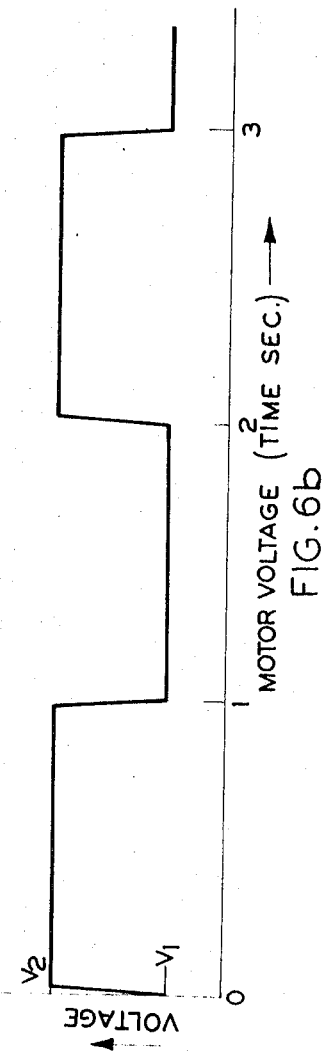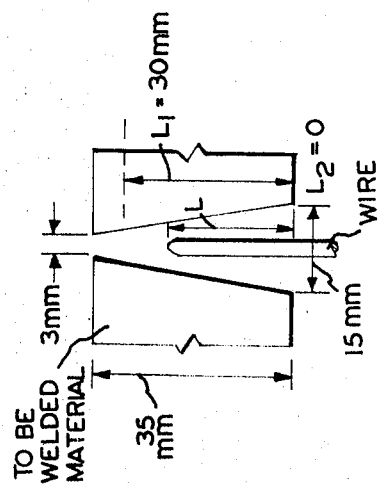

METHOD OF ARC WELDING THICK MEMBERS BY RECIPROCATION OF A WELDING WIRE ELECTRODE

This application is a continuation-in-part of Ser. No. 618,215, filed Feb. 23, 1967.

This invention relates generally to method of arc-welding thick members, and more particularly to methods of arc-welding in the vertical direction such thick members as iron and steel plates by using consumable electrodes.

Such welding methods as, for example, the electroslag process or the electrogas process are already used or known as methods of welding such thick members as iron and steel plates by using consumable electrodes. In such conventional welding methods, in automatic or semiautomatic welding, a welding arc is formed between the consumable electrode and the base materials of the members to be welded, the feed of the electrode is so established as to match the melting rate determined mostly by the arc current and the fluctuation of the arc current is adjusted by controlling means which will keep the arc length always at a constant value.

It is generally thought, however, that the electrogas method is efficient and yields good results in welding thick members, while the electroslag method is more advantageous for welding members less than 2 inches thick. As compared with the electroslag method, the electrogas method has the advantages of (1) higher welding speed, (2) greater toughness of the solidified molten metal, and (3) less influence of heat on the welded members. However, as compared with the submerged arc welding and the other welding methods, even the electrogas method requires a much greater heat input and cooling is therefore slower.

This is especially true when such conventional welding methods are used for the vertical welding of thick members, because the consumable electrode is always moved parallel with the welding advancing direction, and therefore a head or a wire guide is inserted directly into the butt groove gap between the members being welded and oscillated in the direction of the thickness of the members when the members are very thick. Therefore, the gap must be wider than the width of the wire guide, in order to ensure electrical insulation from the ends of the members being welded. At the same time, it is necessary to take into consideration possible changes in the width of the gap (such as a change of the prescribed gap width and gap deformation by contraction) due to the upward movement of the guide. Also, in order to carry out its function of guiding the wire, the guide cannot be made too thin. Otherwise it cannot overcome the tendency of the wire to bend. Thus the gap is required to be at least 15—20 mm. wide to accommodate the feeding head, so that a relatively large amount of deposited metal and much heat will be required to carry out the welding.

With high-tension steel and low-temperature steel, which are in great demand, there is a very serious problem in that they tend to be more greatly affected by welding heat, and accordingly, are subject to greater quality deterioration than ordinary steel when welded by the electrogas method. Therefore, even though it is highly efficient, the electrogas method cannot readily be used for welding the above special steels.

Therefore it is an object of the present invention to provide a welding method using consumable electrodes wherein in arc-welding in the vertical direction such thick members as iron and steel plates, the gap between the plates can be made a fraction of that in the conventional electroslag process or electrogas process while still improving welding efficiency and reducing heat input so as to avoid the quality deterioration due to heat welding.

This object is achieved by narrowing the gap of the conventional method so as to make possible greatly raising the welding speed, thereby developing efficiency and reducing heat input. This is made possible by inserting only the wire into the gap, and feeding the wire laterally back and forth across the gap, that is, in the direction crossing the welding direction. In addition, electric control of the wire-feeding speed is used as a means to move the heat source (the arc-generating point) in the direction of thickness of the members so as to make possible the welding with a small gap. Further, the usual water-cooled copper shoe is combined with the gas nozzle in one unit. In addition, the wire is fed at two speeds, fast and slow, according to a particular feeding plane.

Other features and a fuller understanding of the invention may be had from the following description and claims, taken in conjunction with the accompanying drawing, in which:

Figure 7:
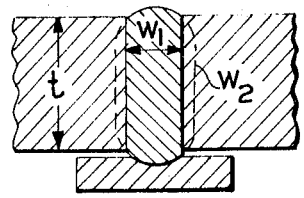
Figure 8A:
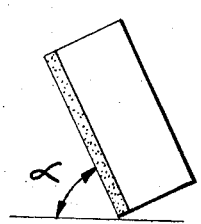
Figure 8B:
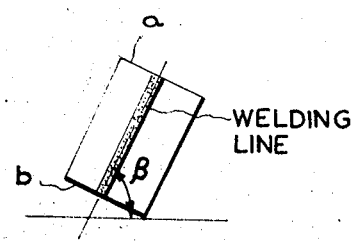

FIGS. 6a—6d are a diagrammatic view of the welding arrangement, and graphs showing the movement and speed of a consumable electrode with the movement of an arc-generating point according to the present invention;

FIG. 7 is a cross section of a welded joint obtained by the present invention; and FIGS. 8a and 8b are an elevation view and a perspective view, respectively, of plates in position for welding.

Figure 1:
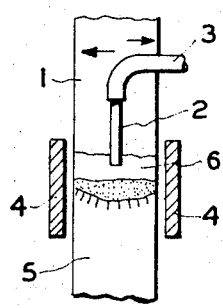
FIG. 1 is a vertical section showing the arrangement for carrying out welding by the conventional electroslag process.

In FIG. 1, which is a vertically sectioned view showing an arrangement for carrying out vertical welding using consumable electrodes by the conventional electroslag process, thick members 1 to be welded, only one of which is visible, are spaced to form a welding gap in which wire or consumable electrode 2 is positioned. A head 3 is provided for feeding said welding wire, and a water-cooled shoe 4 made of copper is positioned at the opposite ends of the gap. The deposited metal is shown at 5 and a slag is shown at 6. The members to be welded are held vertically.

In the above-mentioned conventional method, a sufficiently large gap in which to move the head 3 will be required so that, during welding, a large amount of deposited metal and a large input of heat will be required.

Figure 2:
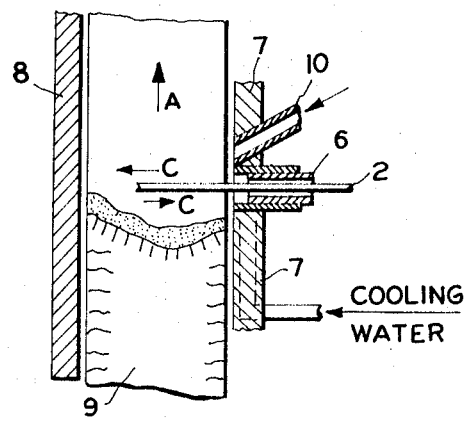
FIG. 2 is a vertical section showing the arrangement for carrying out arc-welding according to the present invention.
Figure 3:
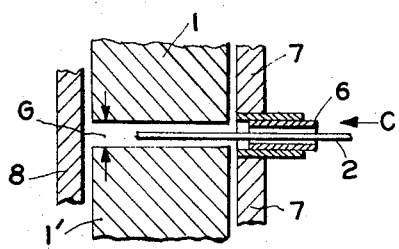
FIG. 3 is a plan view of FIG. 2.

In FIGS. 2 and 3, showing the arrangement for the method of the present invention, only the welding wire 2 or consumable electrode is inserted into the gap transversely of the thickness of the members and is held and fed by being reciprocated only in the axial direction of said wire 2. It is also fed in a direction parallel with the weld-advancing direction as in the conventional method. Because the feeding head 6 is not inserted into the gap, the gap can be kept very narrow. Therefore, both the heat input and the amount of deposited metal can be reduced and a weld in which there is only a small heat-affected zone can be economically obtained. This is quite different from the conventional method. That is to say, in the method of the present invention, perpendicularly positioned steel members 1 and 1' to be welded together are butted against each other as to leave a proper I-shaped or very slightly V-shaped gap into which the welding wire 2 is to be fed. When the gap is V-shaped, the angle is less than 20°. Only the welding wire 3 is extended into the gap from a position at the side of the steel members 1 and 1'. A steel backing plate 8 is positioned against the other side of said members to be welded. During the welding, said welding wire 2 is fed through the feeding head 6 in the direction indicated by the arrow C. The feeding direction of said welding wire 2 is not limited to that shown in FIG. 2, but may be in a direction obliquely crossing the weld-advancing direction, i.e. the direction in which the gap extends along the plate. However, the crossing angle should be close to 90° and no greater than 60° (30° to the horizontal in FIG. 2). A welding arc is generated between the tip of the welding wire 2 and the base members 1 and 1' to be welded and the weld metal from the wire is deposited in the gap G. During the feeding, the tip of the wire 2 is reciprocated in the axial direction of the wire and transversely to the thickness of the members 1 and 1'. This reciprocation is carried out by controlling the feeding speed of said welding wire 2 first so that it is a substantially constant speed higher than the speed of consumption of the wire under the current conditions at the front of the gap for moving the tip of the wire rearwardly across the gap, and then so that it is a substantially constant speed lower than the speed of consumption of the wire under the current conditions at the rear of the gap for moving the tip of the wire forwardly across the gap. With said reciprocation, the position of the arc-generating point will be changed rightward or leftward in FIG. 2. As soon as the deposited metal 9 is formed, it will be supported by water-cooled shoe 7 and will flow to the members defining the gap G. With the advance of the welding, said shoe 7 will also be moved upward. Needless to say, said shoe 7 can be mounted so as to cover the entire length of the welding gap and the feeding head 6 can be made movable. Further, a shielding gas for protecting the welded part is fed through a feeding nozzle 10 mounted in the shoe 7 so as to prevent the welded part from being contacted by the atmosphere. In order for the feeding nozzle 10 for the shielding gas to feed the shield gas to the welded part as intended, it can be mounted integrally in either the shoe as shown in the drawings, or the backing plate 8, or can be separate pipe extending into the gap above the shoe 7. If it is mounted in the backing plate 8, the backing plate must be movable along the gap with the shoe 7, while if the feeding nozzle 10 is separate, it must be movable with the shoe 7. The feeding nozzle 10 shown in FIGS. 2 and 3 is provided in the shoe 7 in an inclined position above the head 6. The same kind of water-cooled shoe made of copper such as that provided on the welding-wire-feeding side can be used in place of said steel backing plate 8.

Figure 4:
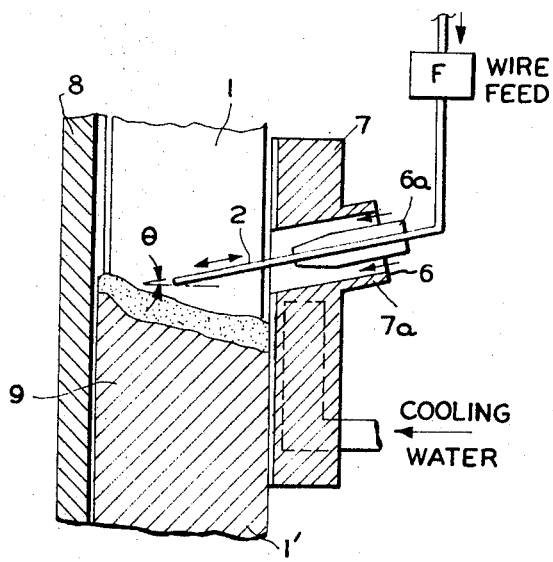
FIG. 4 and 5 are views similar to FIGS. 2 and 3 showing a combined wire feed and shielding gas nozzle.
Figure 5:
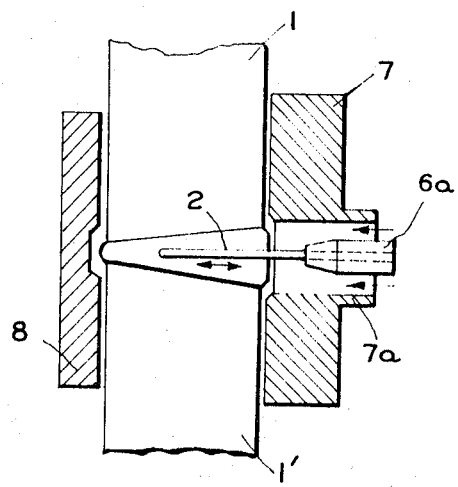

The embodiment shown in FIGS. 4 and 5 is essentially the same as that in FIGS. 2 and 3 except for the construction of the wire-feeding head and shielding-gas nozzle. The feeding head 6a is positioned within the gas nozzle 7a, there being a space around the feeding head through which the shielding gas flows. Also, in this arrangement, it will be seen that the opposed edges of the members 1 and 1' to be welded are at an angle so as to make the gap V-shaped, and that the wire-feeding head as at a small angle $\Theta$ to the horizontal so that the wire is fed at this angle $\Theta$. The angle shown is about 15°, and it should be no greater than 30°.

In tests carried out on shield gas for welding according to the present invention, the best results were obtained from a mixture of Ar and $CO_2$. When $CO_2$ was used alone, so much spatter was produced that the arc became instable at the instant the arc reached a point adjacent the sliding metal shoe 7 at the time it was just starting to move back toward the backing plate 8, causing interruption of the arc. In the next moment after the arc is interrupted, the wire will move toward the other side of the gap to the molten metal pool, and the arc is reestablished there. However, the arc will be interrupted during part of the time it is moving back, and such instable operation is apt to be repeated. When the ratio of Ar was increased, such unstable operation was reduced, and with a $CO_2$ ratio of less than 20 percent, the reciprocal movement of the arc-generating point, and accordingly, the welding effect, became stable.

Because of the necessity of feeding the wire only in the axial direction according to the present invention, the following control of the wire feeding is carried out.

In FIG. 6, L is the length of wire projecting into the gap; $L_1$ indicates the maximum of length which the wire extends; and $L_2$ indicates the minimum length the wire extends. The arc-generating point is made to move back and forth in the direction of the thickness of the members to be welded by periodically changing the wire-feeding speed, that is alternating between a high speed and a slow speed periodically. The means F for feeding the wire, which is shown only schematically in FIG. 4 of the drawings, includes a motor driven by an electrical power source. A control system to increase and decrease the voltage supplied to the motor is provided.

Because the gap is generally narrower toward the back, the weld material 9 will generally be higher at the back, i.e. the part of the gap remote from the shoe 7, as shown in both FIGS. 2 and 4. The tip of a wire, on the other hand, moves in a generally horizontal line, inclined only slightly because of the upward movement of the shoe 7. Therefore, there will be a generally constantly changing distance between the tip of the wire and the surface of the weld material. This leads to some change in the length of the arc between the tip of the wire and the weld material as the wire moves back and forth. The change in length of the arc causes a change in the arc current and voltage which in turn changes the rate at which the wire is consumed during welding.

In the method of the present invention, in order to make possible the feeding of the wire by a feeding device which can be set to run at one of a plurality of substantially constant speeds such as electric motor which is supplied with any one of a plurality of voltages which cause it to run at a corresponding substantially constant speed, it is necessary to provide for the changing arc current conditions. This is accomplished by arranging the first speed of the wire feed caused by speed $V_2$ of the motor so that it is higher than the rate of consumption of the wire at the arc conditions at the front of the gap so that the tip of the wire is first moved rearwardly across the width of the gap from the front to the rear. The speed is preferably chosen to be equal to or greater than the speed of consumption of the wire due to the shorter arc and changed arc current and voltage conditions at the back of the gap, so that when the speed is the same as the speed of consumption at the changed arc conditions, the tip of the wire will remain at the back of the gap when it arrives. Thereafter, a second speed of wire feed is arranged, caused by speed $V_1$ of the motor, so that it is lower than the rate of consumption of the wire at the arc condition at the back of the gap so that the tip of the wire is moved forwardly across the gap from the rear to the front. The second speed is preferably chosen to be equal to or greater than the speed of consumption of the wire due to the longer arc and changed arc current and voltage conditions at the front of the gap, so that when the speed is the same as the speed of consumption at the arc conditions at the front of the gap, the tip of the wire will remain at the front of the gap when it arrives.

Referring to FIGS. 6a—6d, at the start of a welding cycle the motor of the feed means F is given an instruction to rotate at a high speed $V_2$ (FIG. 6c) which increase in the voltage of the motor $V_1$ to $V_2$ (FIG. 6b). Because of the delay in the response in the electrical control system, there is a small delay in the voltage rise, and because of the inertia in the motor and the associated parts, there is a delay in the increase of the motor speed. During the increase in speed of the motor, the tip of the wire moves as shown in FIG. 6d, and a short time after the motor of the feed means has reached the predetermined high speed, the tip of the wire reaches the position at the rear of the gap. Because the arc conditions have been changing, the speed of wire consumption is changing in the direction of increasing wire consumption, due to the shortening of the arc, and the high speed $V_1$ of the motor is chosen so that it is equal to the speed of consumption of the wire at the time equilibrium is reached for the arc conditions at the rear of the gap. The position of the wire tip thus becomes fixed at the rear of the gap, being represented by the horizontal line at the top of FIG. 6d.

The reverse sequence occurs at the end of a predetermined time period. The motor of the feed means F is given an instruction to rotate at a lower speed $V_1$ which decrease is brought about by a decrease in the voltage of the motor from $V_2$ to $V_1$. The delay in the response causes a small delay in the voltage fall, and there is a similar delay in the decrease of the motor speed. During the decrease in speed of the motor, the tip of the wire moves as shown in FIG. 6d, and a short time after the motor of the feed means has reached the predetermined low speed, the tip of the wire reaches the position at the front of the gap. Because the arc conditions have been changing, the speed of wire consumption is changing in the direction of decreasing wire consumption, due to the shortening of the arc, and the low speed $V_2$ of the motor is chosen so that it is equal to the speed of consumption of the wire at the time equilibrium is reached for the arc conditions at the rear of the gap. The position of the wire tip thus becomes fixed at the front of the gap, being represented by the horizontal line at the bottom of FIG. 6d.

The present invention will be further explained with reference to an example. In the gas-shielded arc-welding arrangement as shown in FIGS. 4 and 5, mild steel plates 1 and 1' which were 35 mm. thick were butted together at the end surfaces so as to leave a V-shaped gap 3 mm. wide at the narrow end and 15 mm. wide at the wide end, as shown in FIG. 6a. A steel plate 8 which was 6 mm. thick was fixed temporarily to back the said butted members. The welding wire 2 was fed at an angle Θ of 15° to the horizontal. Other conditions were as follows:

| | |
|---|---|
| Welding current | 340–420 a. |
| Welding voltage | 33–35 v. |
| Diameter of wire | 1.6 mm. |
| Welding speed (Wire raising speed) | 0.86 mm./sec. |
| Shield gas | Ar 25 l/min. $CO_2$ 5 l/min. |

The motor of the wire-feeding means F was supplied with a signal to rotate at a high speed, and the motor input voltage was raised from 6 v. to 11 v. As shown in FIG. 6a, the voltage did not rise straight because of the delay in the response of the circuit elements of the motor controls. With the increase in the motor input voltage, the rotation speed of the output shaft of the motor rose from 48 r.p.m. (0.8 r.p.sec.) to 88 r.p.m. (1.5 r.p.sec.). This increase took place over a period of time of 1.2/5 seconds due to the resistance of the wire coil, driving wheels, reduction gears and nozzle tip and mechanical inertia of the wire feed means, etc. The diameter of the feeding roll on said output shaft was 40 mm., and the wire feed speed was changed from 101.1 mm./sec. to 185.3 mm./sec., as shown in FIG. 6b. The position of the tip of the wire moved 30 mm. from the 0 position, as shown in FIGS. 6a and 6d. The wire tip reached the prescribed position in 2/5 second, due to the change of the shape of the groove, the welding current and voltage and the speed of the shoe, and similar reasons. During the course of movement of the wire tip, the wire-feeding speed and the speed at which the wire was consumed became equal so that the wire tip remained at the back of the groove adjacent the back shoe 8 for about 3/5 of a second. One second after the issuance of the signal for the change to high-speed rotation, a signal for changing to low-speed rotation was supplied, and the motor input voltage dropped from 11 v. to 6 v. The motor rotation speed reached the prescribed value in about 1/5 second, and the wire tip reached the O position in about 2/5 second after the above dropping of the voltage at which point the consumption speed equalled the low feed speed.

Good melting of the wire at shoes 7 and 8 was thus provided, thereby avoiding lack of fusion or penetration of the wire and poor welding.

In this example of the present invention, where the groove is V-shaped, the molten weld material 9 is higher at the back shoe 8 than at the front shoe 7. It is possible that with an I-shaped groove and particular conditions of welding current and voltage, the pattern of movement of the wire tip is zigzag in shape, i.e. the dwell time at the front and back of the gap is substantially zero.

As will be understood from the above, according to the method of the present invention, the gap G can be as small as about 3 to 7 mm. where it is an I-shaped gap, so that the gap cross section is small and the welding efficiency will be able to be greatly increased. Because the heat input can be reduced, the heat-affected zone can also be greatly reduced. The same is true with a V-shaped groove, i.e. it can be made relatively narrow.

On the other hand, according to the conventional method, in vertical welding with a gas shield and using an I-shaped groove, the gap G will have to be 15 to 17 mm. wide for about the same plate thickness of 25 mm. as in the above, and it will be impossible to use such a narrow gap as in the present invention. Further, as understood also from the width $W_2$ of the heat-affected zone, in the present invention, at the time of welding, the heat input will be small and the heat-affected zone will not become brittle.

When welding with any shape gap, it is preferable that the arc-generating point should be reciprocated for a distance substantially equal to the plate thickness between the gap surfaces as a rule.

The advantageous effects of the method of the present invention are most evident when welding is carried out in the vertical direction, i.e. when the angle between the members to be welded and the horizontal is as large as, for example, 90°. This angle is either the angle $\alpha$ or angle $\beta$ as shown in FIGS. 8a or 8b. It is difficult to use the present method where the angle between the members to be welded and the horizontal is small, so that the welding wire is moving substantially vertically, because the molten metal will flow downwardly into the gap between the members to be welded and fusion will be incomplete at the bottom of the gap. It is only when the angle between the members to be welded and the horizontal increases above 30° that the advantageous effects of the method of the present invention appear.

Although we have described our invention with a certain degree of particularly, it is understood that the present disclosure has been made only by way of example and that numerous changes in the details of construction and the combination and arrangement of parts may be resorted to without departing from the spirit and scope of the invention as hereinafter claimed.

What we claim is:

1. An arc welding method for welding thick members by vertical gas-shield welding using consumable electrodes, comprising the steps of butting together the members to be welded to define between them a narrow gap having a small angle between the opposed surfaces of the members defining the gap, extending only a consumable electrode or wire into the gap with the axial dimension of the portion of said electrode or wire within the gap extending only substantially in the direction of the thickness of the members at an acute angle of no more than about 30° to the direction of the thickness, and while generating an arc between the tip of the electrode or wire and the members to be welded, first feeding the electrode or wire in the direction of the axis of the electrode or wire rearwardly from the front of the gap at a first substantially constant speed which is higher than the speed of consumption of the electrode or wire under the arc conditions at the front of the gap so that the position of the tip of the electrode or wire moves rearwardly across the gap, and then feeding the electrode or wire rearwardly from the front of the gap at a second substantially constant speed which is lower than the speed of consumption of the electrode or wire under the arc conditions at the rear of the gap so that the position of the tip of the electrode or wire moves forwardly across the gap.

2. A method as claimed in claim 6 further comprising providing a feeding head in a shoe extending along the gap, and reciprocating and feeding the electrode or wire through the feeding head.

3. A method as claimed in claim 6 in which the axis of the wire is inclined to the direction of the thickness of the plates.

4. A method as claimed in claim 6 in which a shielding gas is also fed to the gap.

5. A method as claimed in claim 6 in which the arc conditions at the rear of the gap are different than at the front of the gap and cause a greater speed of consumption of the wire, and the first speed of feed in the rearward direction is chosen to be the same as the speed of consumption of the wire at the rear of the gap, and the second speed of feed of the wire in the rearward direction is chosen to be the same as the speed of consumption of the wire at the front of the gap, whereby the tip of the wire can be caused to remain at the rear and front of the gap respectively until the speed of the feed is changed.